(12) United States Patent
Song et al.

(10) Patent No.: US 8,937,414 B2
(45) Date of Patent: Jan. 20, 2015

(54) ELECTRIC MOTOR AND ELECTRIC VEHICLE HAVING THE SAME

(75) Inventors: Hyeokjin Song, Seoul (KR); Kwangwook Chun, Seoul (KR); Jacho Kim, Seoul (KR); Jiseong Park, Seoul (KR); Seungdo Han, Seoul (KR)

(73) Assignee: LG Electronics Inc., Seoul (KR)

( * ) Notice: Subject to any disclaimer, the term of this patent is extended or adjusted under 35 U.S.C. 154(b) by 199 days.

(21) Appl. No.: 13/511,904

(22) PCT Filed: Apr. 26, 2012

(86) PCT No.: PCT/KR2012/003237
§ 371 (c)(1),
(2), (4) Date: May 24, 2012

(87) PCT Pub. No.: WO2012/148189
PCT Pub. Date: Nov. 1, 2012

(65) Prior Publication Data
US 2013/0285485 A1    Oct. 31, 2013

(30) Foreign Application Priority Data

Apr. 27, 2011 (KR) .......................... 10-2011-0039748
Jan. 26, 2012 (KR) .......................... 10-2012-0043655

(51) Int. Cl.
*H02K 9/19*    (2006.01)
*H02K 5/20*    (2006.01)

(52) U.S. Cl.
USPC ............. 310/58; 310/400; 310/410; 310/411; 310/254.1

(58) Field of Classification Search
None
See application file for complete search history.

(56) References Cited

U.S. PATENT DOCUMENTS

| | | | |
|---|---|---|---|
| 6,323,613 B1 * | 11/2001 | Hara et al. | 318/471 |
| 2003/0141769 A1 * | 7/2003 | Kubo | 310/12 |
| 2004/0134204 A1 * | 7/2004 | Honda | 62/134 |
| 2008/0164773 A1 * | 7/2008 | Wang | 310/54 |
| 2009/0261668 A1 * | 10/2009 | Mantere | 310/54 |

FOREIGN PATENT DOCUMENTS

| | | | | |
|---|---|---|---|---|
| EP | 1154548 | * 11/2001 | ............. | 310/216.114 |
| JP | 2001-238406 | 8/2001 | | |
| JP | 2010-263744 | 11/2010 | | |
| KR | 10-0193431 | 2/1999 | | |
| KR | 10-2003-0081524 | 10/2003 | | |
| KR | 10-2005-0021374 | 3/2005 | | |
| KR | 10-2009-0001045 | 1/2009 | | |
| KR | 10-2009-0110794 | 10/2009 | | |

* cited by examiner

*Primary Examiner* — Tran Nguyen
(74) *Attorney, Agent, or Firm* — McKenna Long & Aldridge LLP

(57) ABSTRACT

Disclosed are an electric motor and an electric vehicle having the same. The electric motor includes a stator including a stator core and a stator coil wound around the stator core, a rotor disposed to be rotatable with respect to the stator, and a cooling unit configured to allow a cooling fluid to flow therein and disposed to be in contact with the stator to cool the stator, wherein an outer surface of the stator core includes grooves in which the cooling unit is inserted. Cooling performance can be enhanced by shortening a heat transmission path, and the cooling unit can be easily fabricated and coupled.

12 Claims, 18 Drawing Sheets

ELECTRIC MOTOR AND ELECTRIC VEHICLE HAVING THE SAME

This application claims the benefit of priority of PCT Application No. PCT/KR2012/003237 filed on Apr. 26, 2012 which claims the benefit of priority of Korean Application No. 10-2011-0039748 filed on Apr. 27, 2011 and Korean Application No. 10-2012-0043655 filed on Apr. 26, 2012, all of which are incorporated by reference in their entirety herein.

TECHNICAL FIELD

The present invention relates to an electric motor and an electric vehicle having the same, and more particularly, to an electric motor having enhanced cooling performance by shortening a heat transmission path, and an electric vehicle having the same.

BACKGROUND ART

Recently, due to an environmental pollution resulting from an exhaust gas of vehicles, depletion of fossil fuel, and the like, electric vehicles or hybrid vehicles (referred to as 'electric vehicles', hereinafter) using an electric motor as a power source or an auxiliary power source are on the rise.

The electric motor may include an outer case, a stator disposed within the outer case, and a rotor disposed to be rotatable with respect to the stator.

Meanwhile, an electric motor used in an electronic vehicle is required to have a high output density, so the electric motor is required to have high cooling performance.

However, in the related art electric motor of an electric vehicle, a cooling unit is provided at the outer case, so a heat transmission path from a stator coil which generates heat to the cooling unit for cooling heat from the stator coil may be lengthened. Thus, there is a limitation in enhancing heat exchange efficiency and cooling performance by the cooling unit provided at the outer case.

Also, when the heat transmission path from the heat source to the cooling unit is lengthened, temperature of a heating component can be increased to result in a degradation of an output.

Also, a forcible degradation may be accelerated due to a temperature increase, and thus, a life span may be shortened.

DISCLOSURE

Technical Problem

An aspect of the present invention provides an electric motor having enhanced cooling performance by shortening a heat transmission path, and an electric vehicle having the same.

Another aspect of the present invention provides an electric motor capable of cooling a coil end of a stator coil, and an electric vehicle having the same.

Another aspect of the present invention provides an electric motor capable of restraining an internal temperature rise, and an electric vehicle having the same.

Another aspect of the present invention provides an electric motor capable of facilitating fabrication and coupling of a cooling unit, and an electric vehicle having the same.

Technical Solution

According to an aspect of the present invention, there is provided an electric motor including: a stator including a stator core and a stator coil wound around the stator core; a rotor disposed to be rotatable with respect to the stator; and a cooling unit configured to allow a cooling fluid to flow therein and disposed to be in contact with the stator to cool the stator, wherein an outer surface of the stator core includes grooves in which the cooling unit is inserted.

The grooves may be depressed in a radial direction on the outer surface of the stator core and extend in an axial direction, and the cooling unit may be formed by bending a pipe having an extended length several times.

The grooves may be depressed in a radial direction on the outer surface of the stator core and extend in an axial direction, and the cooling unit may include a plurality of partial cooling units formed by bending a pipe having an extended length several times.

The partial cooling units may be connected in series by a connection pipe.

The partial cooling units may be connected to be parallel.

Each of the partial cooling units may include a cooling fluid inlet and cooling fluid outlet allowing a cooling fluid to be introduced or discharged therethrough, respectively.

The cooling unit may include an entirety cooling mode in which the cooling fluid is supplied to all of the partial cooling units and a partial cooling mode in which the cooling fluid is supplied to a portion of the partial cooling units.

The grooves may be depressed in the radial direction on the outer surface of the stator core and extend in a spiral form.

The cooling unit may include a stator core cooling unit for cooling the stator core and a coil end cooling unit for cooling a coil end of the stator coil.

According to another aspect of the present invention, there is provided an electric vehicle including: a vehicle body; a battery provided in the vehicle body; and the foregoing electric motor connected to the battery to provide driving force to the vehicle body.

The electric motor may further include a frame accommodating the stator and the rotor therein.

The frame may include a support portion for supporting the stator such that the stator is curbed in an axial direction.

The cooling unit may include linear section portions disposed in an axial direction on the stator core and curved section portions connecting the linear section portions, and the support portion may be protruded from both end portions of the frame and disposed between the curved section portions.

The electric vehicle may further include: an inverter device connected to the stator coil and controlling power, wherein the outer case may include an inverter device mounting unit on which the inverter device is mounted.

The electric vehicle may further include an air-conditioner providing thermally treated air to the vehicle body; and a cooling fluid circulation unit in which a cooling fluid circulates by way of the cooling unit of the electric motor, wherein the cooling fluid circulation unit is configured to form a closed loop in which the cooling, which has passed through the cooling unit, is introduced into a heat exchanger of the air-conditioner so as to be cooled and the cooling fluid which has passed through the heat exchanger passes through the inverter device so as to be cooled, and then, is introduced into the cooling unit so as to circulate.

Advantageous Effects

According to embodiments of the present invention, since the cooling unit is provided to be in direct contact with the stator, the heat transmission path between the cooling unit and the stator coil, a heat source, can be shortened. Thus, cooling performance can be enhanced.

Also, since the grooves are formed to be depressed in a radial direction on an outer surface of the stator core and extend in an axial direction and the cooling unit is inserted from the outer side of the stator core, the cooling unit can be easily coupled to the stator.

Also, since the cooling unit is formed by bending a pipe having an extended length several times, the cooling unit can be easily fabricated.

Also, since the cooling unit includes a plurality of partial cooling units formed by bending a pipe having an extended length several times, the cooling unit can be easily coupled to the grooves of the stator core.

Also, since the coil end of the stator coil can be cooled, an increase in the internal temperature of the outer case can be suppressed.

Also, since the shape and material of the outer case can be changeable, outer cases which have various shapes and are made of various materials can be provided. Thus, the outer case can be easily installed without interfering with peripheral components.

MODE FOR INVENTION

Embodiments of the present invention will be described in detail with reference to the accompanying drawings.

Figure 1:
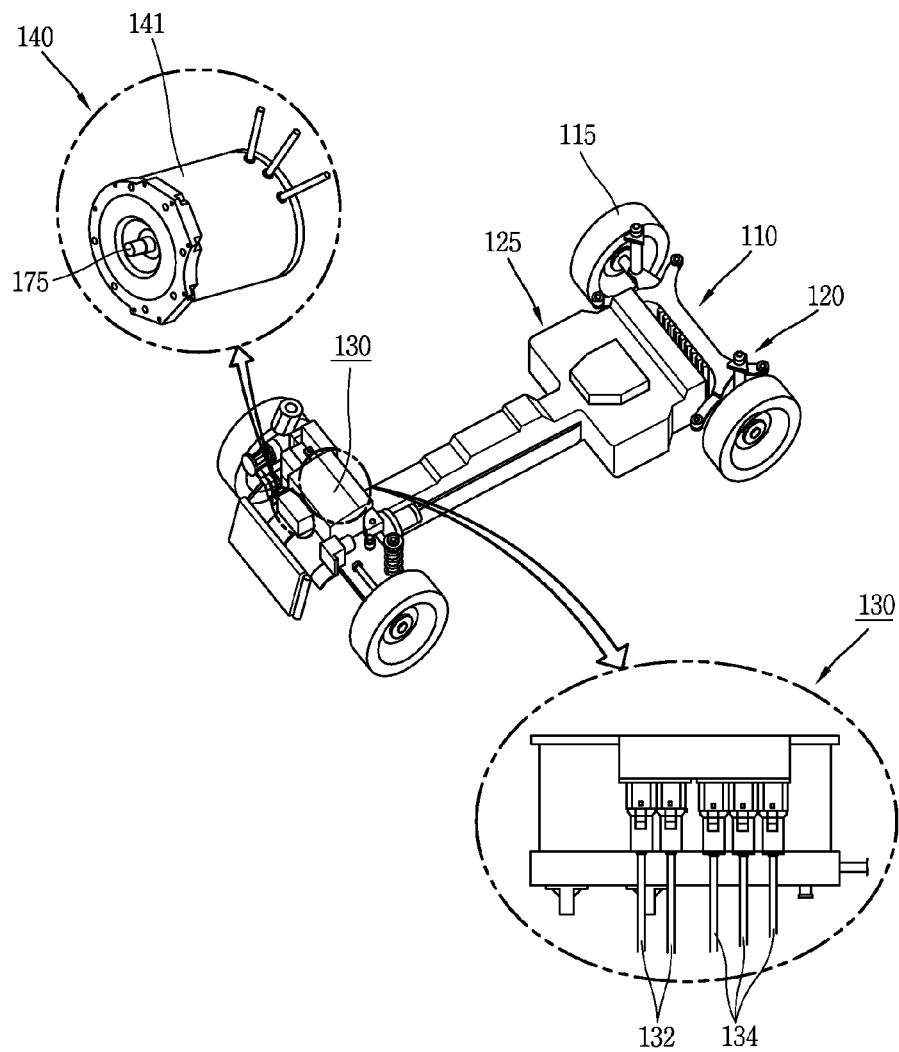
FIG. 1 is a schematic view showing the configuration of an electric vehicle according to an embodiment of the present invention.

As shown in FIG. 1, an electric vehicle according to an embodiment of the present invention may include a vehicle body 110, a battery 125 provided in the vehicle body 110, and an electric motor 140 connected with the battery 125 to provide driving force to the vehicle body 110.

A passenger space (not shown) allowing a driver and a passenger to get on may be provided at an upper area of the vehicle body 110.

A plurality of wheels 115 allowing the vehicle to run may be provided at the vehicle body 110.

The wheels 115 may be disposed at both of front and rear sides of the vehicle body 110.

A suspension device 120 may be provided between the vehicle body 110 and the wheels 115 in order to lessen vibration and impact generated when the vehicle is running on the road.

The battery 125 may be provided in the vehicle body 110 in order to supply power.

The battery 125 may be configured as a rechargeable battery that can be charged and recharged.

The electric motor 140 may be provided in the vehicle body 110 in order to provide driving force to the wheels 115.

An inverter device 130 may be provided between the electric motor 140 and the battery 125. The inverter unit 130 may convert DC power provided from the battery 125 into AC power and provide the converted AC power to the electric motor 140.

The inverter device 130 may include an input cable 132 and an output cable 134. Accordingly, the inverter device 130 may be connected to the battery 125 and the electric motor 140.

Meanwhile, the electric motor 140 according to an embodiment of the present invention may include a stator 150 including a stator core 151 and a stator coil 161 wound around the stator core 151; a rotor 170 disposed to be rotatable with respect to the stator 150; and a cooling unit 180 having a cooling fluid and disposed to be in contact with the stator 150 to cool the stator 150. Here, the stator 150 and the rotor 170 may be configured as a 3-phase AC electric motor which rotates by 3-phase AC power.

Figure 2:
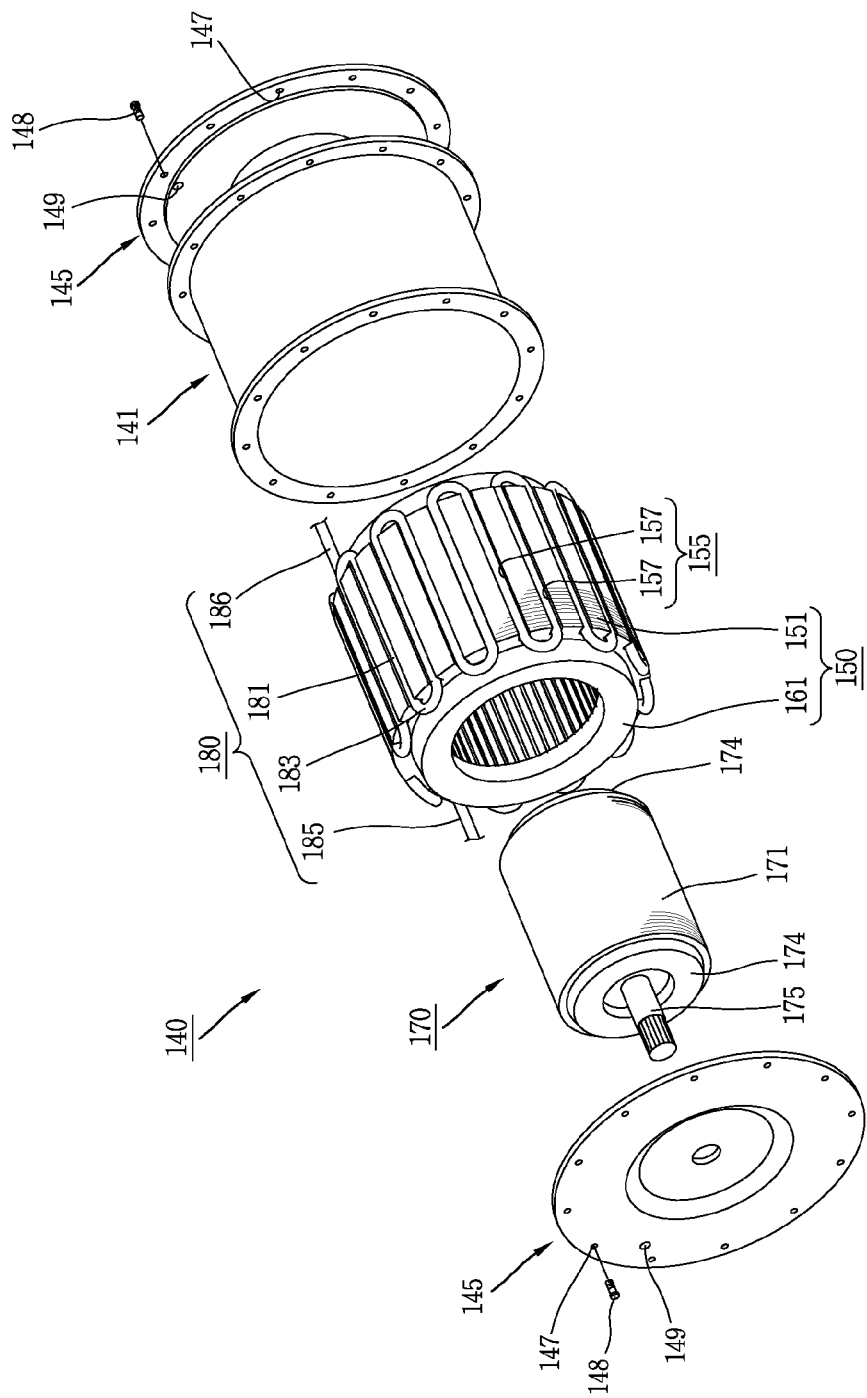
FIG. 2 is an exploded perspective view of an electric motor of FIG. 1.
Figure 3:
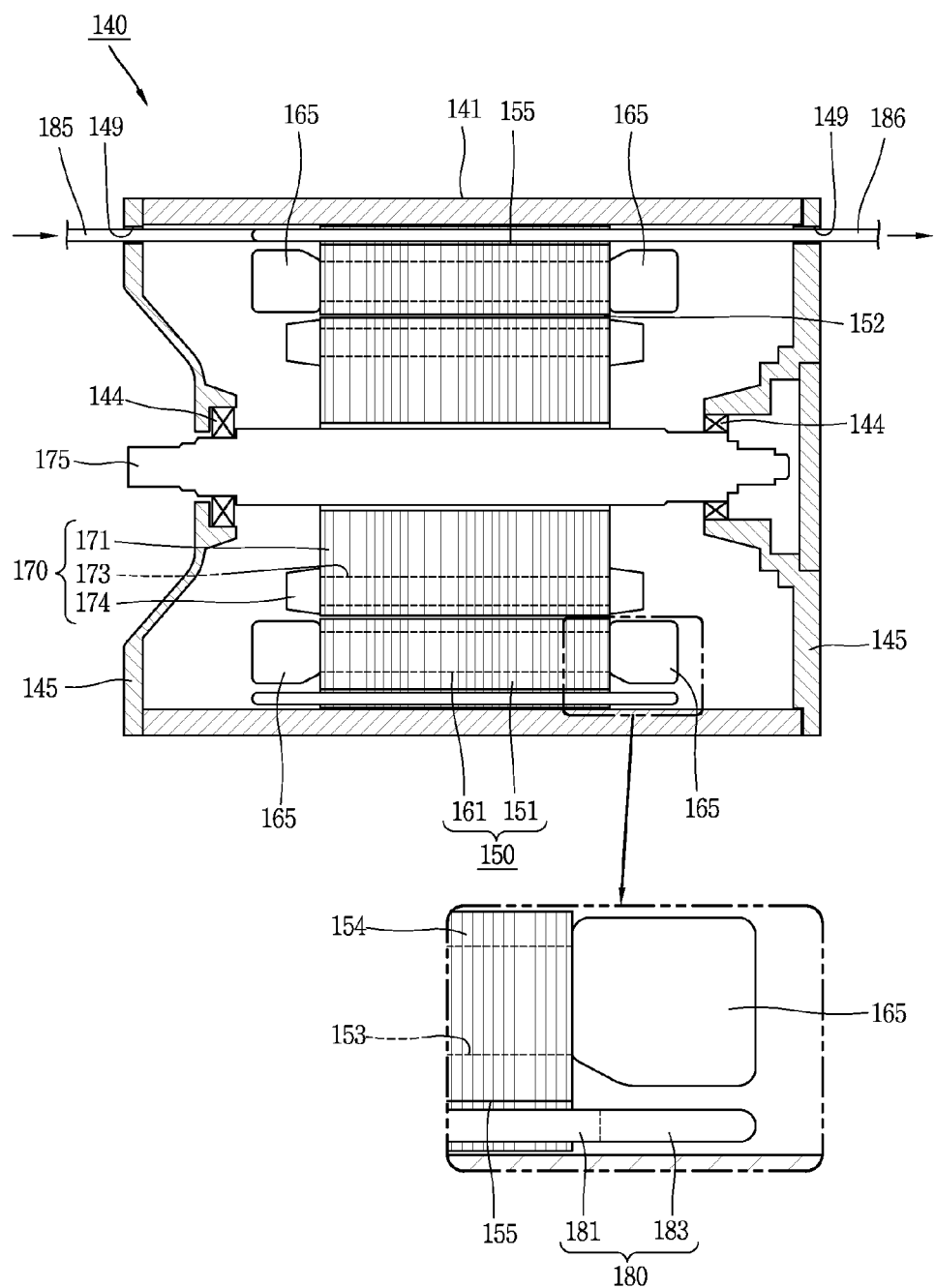
FIG. 3 is a sectional view of a coupled state of FIG. 2.

As shown in FIGS. 2 and 3, an outer case 141 may be provided at an outer side of the stator 150.

The outer case 141 may be formed to include an accommodation space therein.

The outer case 141 may be appropriately formed in consideration of the shape of the stator 150 in order to accommodate the stator 150 therein. For example, the outer case 141 may have a polygonal shape. Hereinafter, a case in which the outer case 141 is configured to have a cylindrical shape with both sides opened will be described as an example.

The outer case 141 may be formed of a metallic member or a synthetic resin member.

A bracket 145 may be provided at an end portion of the outer case 141. The bracket 145 may be coupled to both end portions of the outer case 141.

The bracket 145 may be formed to have a disk-like shape to correspond to the end portion of the outer case 141.

A plurality of insertion holes 147 may be formed on the bracket 145 to allow fastening members 148 to be coupled to the end portion of the outer case 141 therethrough.

A bearing 144 may be provided in the bracket 145 in order to rotatably support a rotational shaft 175 of the rotor 170.

The stator 150 may include a stator core 151 having a plurality of slots 153 and teeth 154, and a stator coil 161 wound around the stator core 151.

A circular rotor accommodation space 152 may be formed at the center of the stator core 151 in order to rotatably accommodate the rotor 170. The plurality of slots 153 and the teeth 154 may be formed on an inner diameter portion of the stator core 151 along a circumferential direction of the rotor accommodation space 152.

The stator core 151 may be formed by laminating an electric steel sheet (or an electric steel plate) with the rotor accommodation space 152, the slots 153, and the teeth 154 formed thereon in an insulating manner.

For example, the rotor 170 may be configured as a so-called induction rotor including a rotor core 171, a plurality of conductor bars 173 coupled to the rotor core 171, and an end ring 174 electrically connecting the conductor bars 173. The rotational shaft 175 may be integrally coupled at the center of the rotor core 171 such that it is rotatable. In the present embodiment, a case in which the rotor is configured as an inductor rotor is taken as an example, but the rotor may be configured as a so-called permanent magnet rotor including a permanent magnet. Also, the rotor may be configured as a synchronization rotor using a difference in magnetic resistance (reluctance). Also, the rotor may be configured as a hybrid rotor having a magnetic resistance difference and a permanent magnet. Also, the rotor may be configured to include a field winding which generates magnetic force when power is applied.

Meanwhile, the cooling unit 180 may be provided on the stator core 150. The cooling unit 180 may be in direct contact with the stator 150 to cool the stator 150. Accordingly, a heat transmission path for exchanging (transmitting) heat between the stator coil 161 and the cooling unit 180 can be shortened to quickly cool the stator 150. Here, that the heat transmission speed is increased according to the shortened heat transmission path may include excluding an air layer (section) in the heat transmission path, as well as shortening of a physical length. Accordingly, the heat transmission speed between the stator coil 161 and the cooling unit 180 can be significantly increased.

A cooling unit coupling unit 155 may be formed on the stator core 151 in order to couple the cooling unit 180 to the stator core 151.

For example, the cooling unit coupling unit 155 may be configured to include a plurality of linear grooves 157 which are inwardly depressed along a radial direction on an outer circumferential surface of the stator core 151 and penetrating the stator core 151 in an axial direction. Accordingly, the cooling unit 180 and the stator core 151 can be easily coupled. Also, the cooling unit 180 can be easily fabricated.

The linear grooves 157 may be formed to be spaced apart in a circumferential direction of the stator core 151. Accordingly, the stator core 151 can be quickly cooled.

The cooling unit 180 may be configured to include a flow path allowing a cooling fluid to flow therealong and may be coupled to the stator core 151.

The cooling unit 180 may include linear section portions 181 penetrating the stator core 151 and curved section portions 183 connecting the linear section portions 181 such that they linear section portions 181 communicate with each other.

The linear section portions 181 are disposed in an axial direction and coupled to the stator core 151.

The curved section portions 183 may have a U-shape.

Both end portions of the curved section portions 183 may be coupled to one end portion of each of two adjacent linear section portions 181. Accordingly, two linear section portions 181 may be connected to communicate with each other.

The cooling unit 180 may include a cooling fluid inflow portion 185 through which the cooling fluid is introduced, and a cooling fluid outflow portion 186 through which the cooling fluid flows out.

The cooling fluid inflow portion 185 and the cooling fluid outflow portion 186 may be drawn to outside through the bracket 145.

Figure 4:
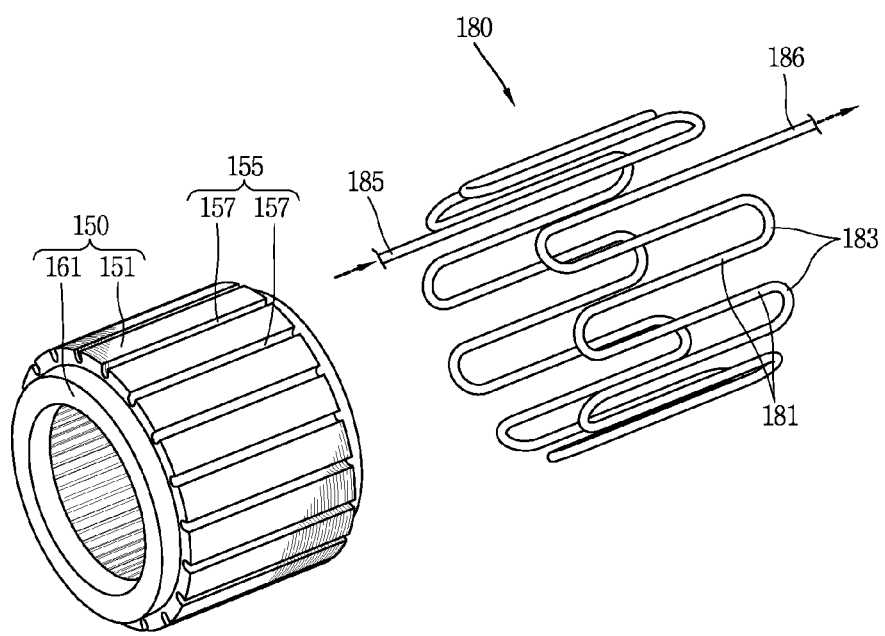
FIG. 4 is a view showing an exploded perspective view of a stator core and a cooling unit of FIG. 4.
Figure 5:
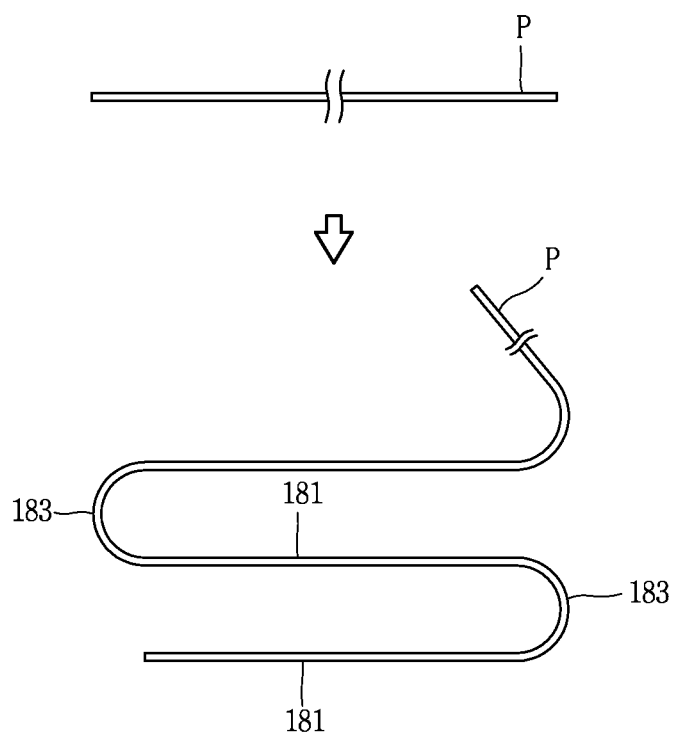
FIG. 5 is a view explaining a process of forming the cooling unit of FIG. 4.

As shown in FIGS. 4 and 5, the cooling unit 180 may be configured by bending a single pipe (P) having an extended length in zigzags such that a plurality of linear section portions 181 and a plurality of curved sections 183 are formed. Here, since the linear section portions 181 and the curved sections 183 are formed by simply bending a single long pipe, the cooling unit 180 can be easily fabricated.

The cooling fluid inflow portion 185 may be provided at one end portion of the cooling unit 180, and the cooling fluid outflow portion 186 may be provided at the other end of the cooling unit 180. Here, a case in which the cooling fluid inflow portion 185 and the cooling fluid outflow portion 186 are led out in the mutually different directions is taken as an example, but the cooling fluid inflow portion 185 and the cooling fluid outflow portion 186 may be configured to be led out in the same direction.

When the cooling unit 180 is intended to be coupled to the stator core 151, both end portions of the cooling unit 180, namely, the cooling fluid inflow portion 185 and the cooling fluid outflow portion 186 may be opened appropriately in the circumferential direction, and then, the stator core 151 may be inserted thereinto. Thereafter, the corresponding linear section portions 181 of the cooling unit 180 may be sequentially inserted into the linear grooves 157 of the stator core 151.

Figure 6:
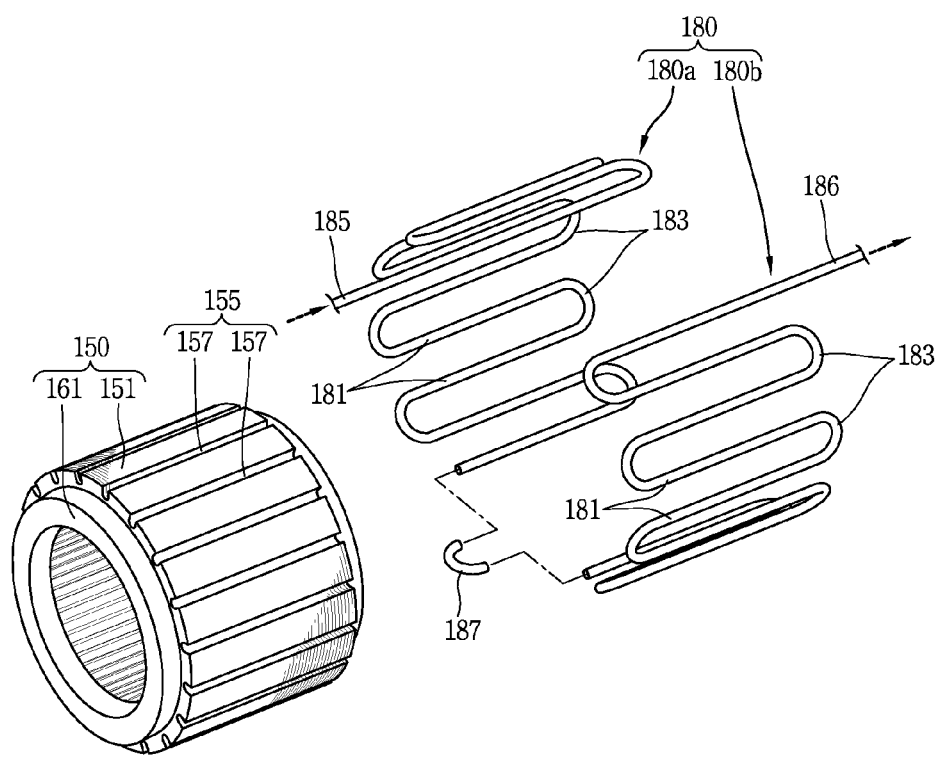
FIG. 6 is an exploded perspective view of a variant of the cooling unit of FIG. 4 before being coupled.

Meanwhile, as shown in FIG. 6, the cooling unit 180 may include a first partial cooling unit 180a and a second partial cooling unit 180b disposed on the circumference of the stator core 151 and coupled to the stator core 151, and connection pipes 187 connecting the first partial cooling unit 180a and the second partial cooling unit 180b such that they communicate with each other.

The first partial cooling unit 180a and the second partial cooling unit 180b may be formed by bending two pipes having an extended length such that they have the linear section portions 181 and the curved sections 183, respectively. Accordingly, the stator core 151 and the cooling unit 180 (substantially, the first partial cooling unit 180a and the second partial cooling unit 180b) may be easily coupled.

In detail, the respective partial cooling units 180a and 180b are disposed at an outer surface of the stator core 151, and linear section portions 181 of the respective partial cooling units 180a and 180b may be put on the entrance of the corresponding linear grooves 157 and then inwardly pressed to be to be inserted in a radial direction. Through such a simple operation, the respective partial cooling units 180a and 180b may be easily coupled to the stator core 151.

For example, the connection pipe 187 may have a substantially U-like shape.

One end portion of the first partial cooling unit 180a may be connected to one end of the connection pipe 187, and one end portion of the second partial cooling unit 108b may be connected to the other end portion of the connection pipe 187. Accordingly, the first partial cooling unit 180a and the second partial cooling unit 180b may form a flow path of a single cooling fluid. Here, the connection pipe 187 may be welded to the first partial cooling unit 180a and the second partial cooling unit 180b.

The cooling fluid inflow portion 185 through which a cooling fluid is introduced may be formed on any one of the other end portion of the first partial cooling unit 180a and the other end portion of the second partial cooling unit 180b, and the cooling fluid outflow portion 186 through which a cooling fluid flow out may be formed on the other.

When the cooling unit 180 and the stator core 151 are intended to be coupled, the first partial cooling unit 180a and the second partial cooling unit 180b are disposed on both sides of the stator core 151, and respective linear section portions 181 of the corresponding partial cooling units 180a and 180b are inserted into the respective linear grooves 157 of the stator core 151. Thereafter, the end portions of the first partial cooling unit 180a and the second partial cooling unit 180b may be connected to the connection pipe 187 and welded.

Figure 7:
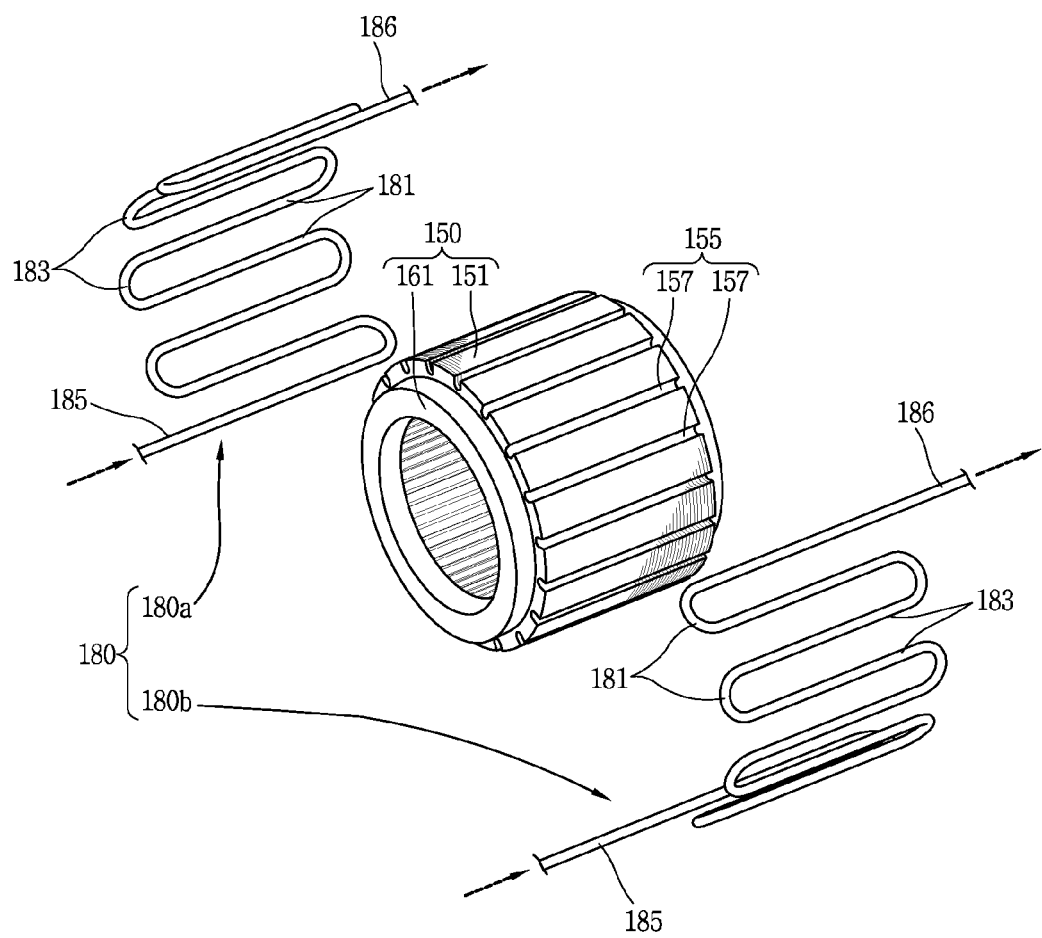
FIG. 7 is an exploded perspective view of another variant of the cooling unit of FIG. 4 before being coupled.

Meanwhile, as shown in FIG. 7, the cooling unit 180 may be configured to include a plurality of partial cooling units 180a and 180b. Here, a case in which the cooling unit 180 is configured to include two partial cooling units, i.e., a first partial cooling unit 180a and a second partial cooling unit 180b, is taken as an example, but the number of the partial cooling units may be appropriately adjusted.

The respective partial cooling units 180a and 180b may be formed by bending an extended pipe a plurality of times such that a plurality of linear section portions 181 penetrating the stator core 151 and a plurality of curved sections 183 connecting the linear section portions in a communicating manner.

The first partial cooling unit 180a and the second partial cooling unit 180b may be configured to include the cooling fluid inflow portion 185 to which a cooling fluid is introduced and the cooling fluid outflow portion 186 from which a cooling fluid flows out, respectively. Namely, the first partial cooling unit 180a and the second partial cooling unit 180b may be connected to be parallel. According to this configuration, a cooling fluid is introduced simultaneously to the first partial cooling unit 180a and the second partial cooling unit 180b through the respective cooling fluid inflow portions 185, the stator core 151 may be further quickly cooled.

Figure 8:
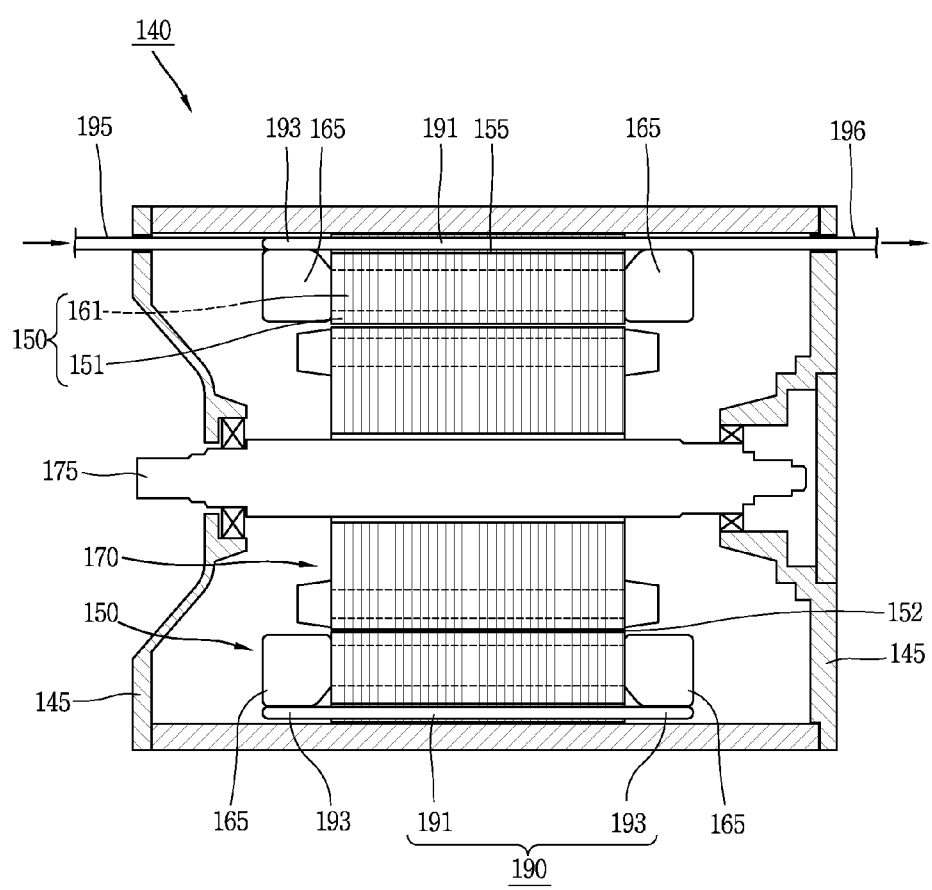
FIG. 8 is a variant of the cooling unit of the electric motor of FIG. 2.

Meanwhile, as shown in FIG. 8, the cooling unit 190 may include a linear section portion 191 coupled to the stator core 151 and a curved section portion 193 protruded from both end portions of the stator core 151, connecting the linear section portions 191 in a communicating manner, and disposed to be in contact with a coil end 165 of the stator coil 161. Accordingly, heat generated from the coil end 165 can be directly quickly transmitted to the curved section portion 193 in contact with the coil end 165, the temperature of the coil end 165 can be restrained from being excessively increased. Also, since heat of the coil end 165 is spread to the periphery, heat of the coil end 165 can be restrained from being spread to the periphery to increase a temperature of the periphery. As a result, an internal temperature of the outer case 141 can be restrained from being increased, thus restraining a degradation of operation efficiency due to an increase in the temperature of the stator 150 and the rotor 170 otherwise resulting from an excessive increase in the internal temperature of the outer case 141.

The cooling unit 190 may include a cooling fluid inflow portion 195 and a cooling fluid outflow portion 196 allowing a cooling fluid to flow in and flow out therethrough, respectively.

Figure 9:
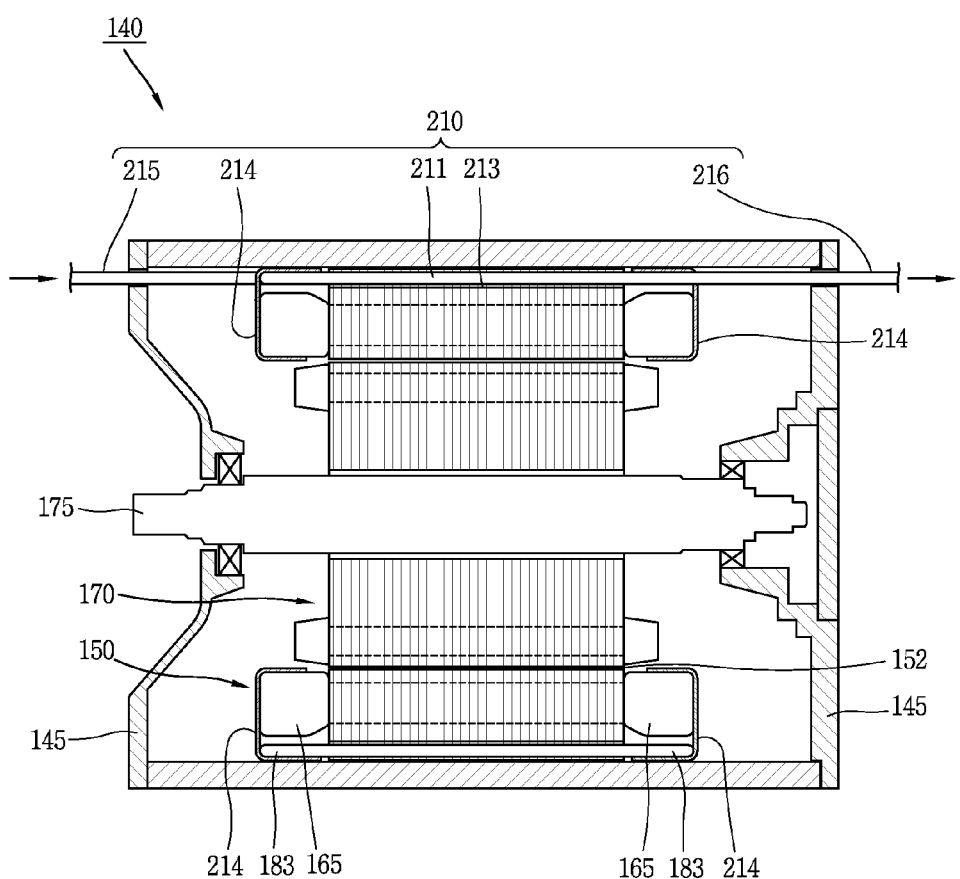
FIG. 9 is a sectional view of an electric motor according to another embodiment of the present invention.

As shown in FIG. 9, the cooling unit 210 may include linear section portions 211 coupled to the stator core 151, curved section portions 213 disposed at end portions of the stator core 151 and connecting the linear section portions 211 in a communicating manner; and a heat transmission member 214 connecting the curved section portions 213 and the coil end 165 of the stator coil 161 such that heat can be transmitted. Accordingly, heat generated from the coil end 165 can be directly, quickly transferred to the curved section portions 193, so the coil end 165 can be quickly cooled. Accordingly, an internal temperature of the outer case 141 can be restrained, thus restraining a degradation of operation efficiency otherwise resulting of an increase in the temperature of the stator 150 and the rotor 170.

The cooling unit 210 may include a cooling fluid inflow portion 215 and a cooling fluid outflow portion 216 allowing the cooling fluid to flow in and flow out, respectively.

The electric vehicle according to the present embodiment may include a cooling fluid circulation unit 220 for circulating a cooling fluid.

Figure 10:
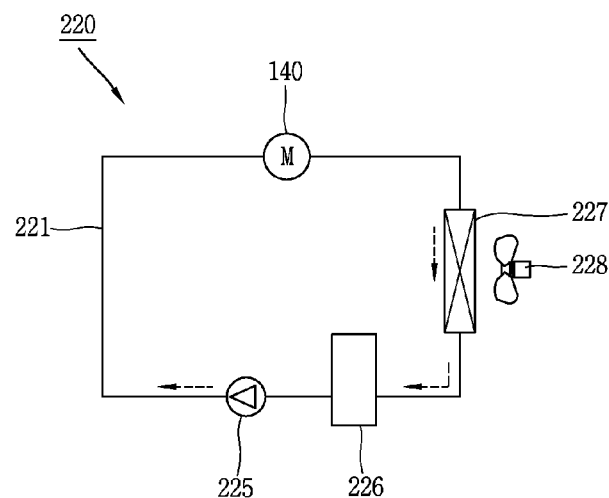
FIG. 10 is a view showing the configuration of a cooling fluid circulation unit of the electric vehicle of FIG. 1.

For example, as shown in FIG. 10, the cooling fluid circulation unit 220 may include a fluid pipe 221 forming a flow path allowing the cooling fluid to flow therein, and a pump 225 accelerating the flow of the cooling fluid.

The fluid pipe 221 may be connected to the cooling unit. In detail, the fluid pipe 221 may be connected to the cooling fluid inflow portion 185 and the cooling fluid outflow portion 186. Accordingly, the cooling fluid may circulate by way of the cooling unit 180.

The cooling fluid circulation unit 220 may include a tank 226 for temporarily storing the cooling fluid. The tank 226 may be disposed at an inflow side of the pump 225.

The cooling fluid circulation unit 220 may include a radiator 227 for cooling the cooling fluid. A cooling fan 228 may be provided at one side of the radiator 227 in order to accelerate a flow of air in contact with the radiator 227.

The electric vehicle according to the present embodiment may be configured to include a controller 230 including a control program.

The controller 230 may be configured to sense a temperature of the cooling fluid and control a flow rate (or a movement speed) of the cooling fluid based on the temperature sensing results.

Figure 11:
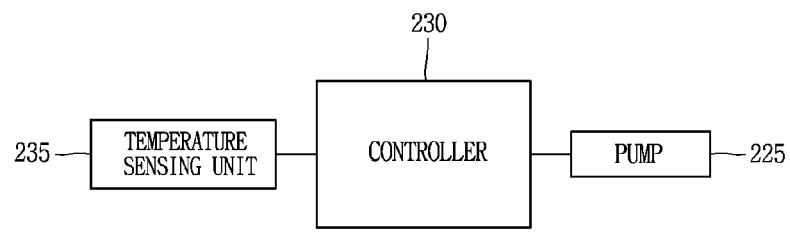
FIG. 11 is a control block diagram of the electric vehicle of FIG. 1.

As shown in FIG. 11, a temperature sensing unit 235 for sensing temperature of the cooling fluid may be connected to the controller 230 such that the temperature sensing unit 235 can transmit a sensing signal to the controller 230.

The pump 225 may be connected to the controller 230 such that the pump 225 can be controlled.

According to such a configuration, when a driving signal for driving the electric motor 140 is input, power is provided to the stator coil 161 and the rotor 170 may rotated about a rotational shaft 175 (by being centered thereon) according to interaction between the stator coil 161 and the rotor 170.

When power is applied to the stator 150, the controller 230 may control the pump 225 to allow the cooling fluid to circulate by way of the cooling unit 180.

The controller 230 may control the temperature sensing unit 235 to sense a temperature of the cooling fluid. When a sensed temperature of the cooling fluid exceeds a pre-set temperature, the controller 230 may control the pump 225 to increase a flow rate of the cooling fluid. When the flow rate of the cooling fluid is increased, a rate at which heat is dissipated from the radiator 227 is faster than a rate at which the cooling fluid is heat-exchanged with the electric motor 140 so as to have an increased temperature, whereby the temperature of the cooling fluid can be lowered.

An electric vehicle having an electric motor according to another embodiment of the present invention will be described with reference to FIG. 12.

The same and equivalent parts as those of the embodiment described and illustrated above will be described by using the same reference numerals, and a repeated description will be omitted.

As described above, an electric vehicle according to the present embodiment may include the vehicle body 110, the battery 125 provided in the vehicle body 110, and the electric motor 140 connected with the battery 125 to provide driving force to the vehicle body 110.

Wheels 115 allowing the vehicle body 110 to run, and a suspension device 120 may be provided in the vehicle body 110.

The battery 125 may be provided in the vehicle body 110 in order to supply power.

The electric motor 140 may be provided in the vehicle body 110 to provide driving force to the wheel 115. An inverter device 130 for converting DC power into AC power may be provided between the electric motor 140 and the battery 125.

The electric motor 140 may include the stator 150 including the stator core 151 and the stator coil 161 wound around the stator core 151; the rotor 170 disposed to be rotatable with respect to the stator 150; and a cooling unit 240 having a cooling fluid and disposed to be in contact with the stator 150 to cool the stator 150.

Figure 12:
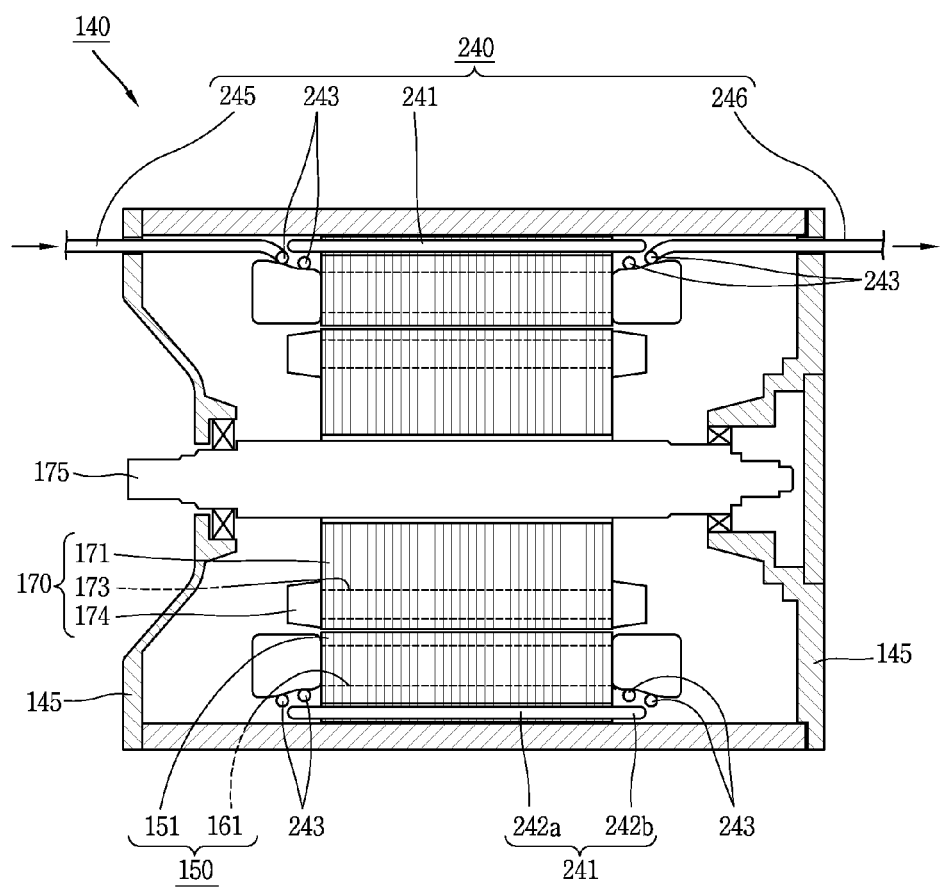
FIG. 12 is a sectional view of an electric motor according to another embodiment of the present invention.

Meanwhile, as shown in FIG. 12, the cooling unit 240 may include a stator core cooling unit 241 in contact with the stator core 151; and a coil end cooling unit 243 in contact with the coil end 165 of the stator coil 161.

The stator core cooling unit 241 may be disposed in an axial direction in the stator core 151.

The stator core cooling unit 241 may include linear section portions 242a disposed in an axial direction on the stator core 151 and curved section portions 242b connecting two adjacent linear section portions 242a at both end portions of the stator core 151 such that they communicate with each other.

The coil end cooling unit 243 may be formed to heat-exchange with the coil end 165 of the stator coil 161. For example, the coil end cooling unit 243 may be formed to have a substantially circular shape or a coil shape such that it is in contact with the circumference of the coil end 165. The coil end cooling unit 243 may be wound several times such that it is in contact with an outer face of the coil end 165.

The coil end cooling units 243 may be formed at both end portions of the stator 150.

The coil end cooling units 243 and the stator core cooling unit 241 may be connected in series. Accordingly, the cooling fluid can cool the coil end 165 and the stator core 151 while sequentially passing through the coil end cooling units 243 and the stator core cooling unit 241.

A cooling fluid inflow portion 245 through which the cooling fluid is introduced may be formed on any one of the coil end cooling units 243, and a cooling fluid outflow portion 246 through which the cooling fluid flows out may be formed on the other of the coil end cooling units 243.

The cooling fluid inflow portion 245 and the cooling fluid outflow portion 246 may be connected to the fluid pipe 221.

Here, although not shown, the stator core cooling unit 241 and the coil end cooling unit 243 may be connected in parallel. Namely, the stator core cooling unit 241 and the coil end cooling unit 243 may include a cooling fluid inflow portion and a cooling fluid outflow portion, respectively, to form a flow path of mutually different cooling units.

According to such a configuration, when the electric motor 140 is driven, the controller 230 controls the pump 225 to allow the cooling fluid to circulate by way of the electric motor 140.

The cooling fluid introduced through the cooling fluid inflow portion 245 may cool the coil end 165 at one side (left side in the drawing) and cool the stator core 151 while passing through the stator core cooling unit 241.

The cooling fluid which has passed through the stator core cooling unit 241 may be introduced into the coil end cooling unit 243 at the other side (right side in the drawing) to cool the coil end 165 and then flow out through the cooling fluid outflow portion 246.

Meanwhile, the discharged cooling fluid passes through the radiator 227 so as to be cooled, and passes through the tank 226 so as to be pumped by the pump 225. Repeating this process, cooling operation may be performed on the electric motor 140.

An electric vehicle including an electric motor according to another embodiment of the present invention will be described with reference to FIGS. 13 through 15.

As described above, an electric vehicle according to the present embodiment may include the vehicle body 110, the battery 125 provided in the vehicle body 110, and the electric motor 140 connected with the battery 125 to provide driving force to the vehicle body 110.

The electric motor 140 may include the stator 150 having the stator core 151 and the stator coil 161 wound around the stator core 151; the rotor 170 disposed to be rotatable with respect to the stator 150; and a cooling unit 250 having a cooling fluid and disposed to be in contact with the stator 150 to cool the stator 150.

The cooling unit 250 may be configured to have a flow path allowing a cooling fluid to flow therein. The cooling unit 250 may be formed to have a pipe-like shape, configured as a thermally conductive member, and having a flow path formed therein.

The cooling unit 250 may be formed to have a spiral shape.

Figure 13:
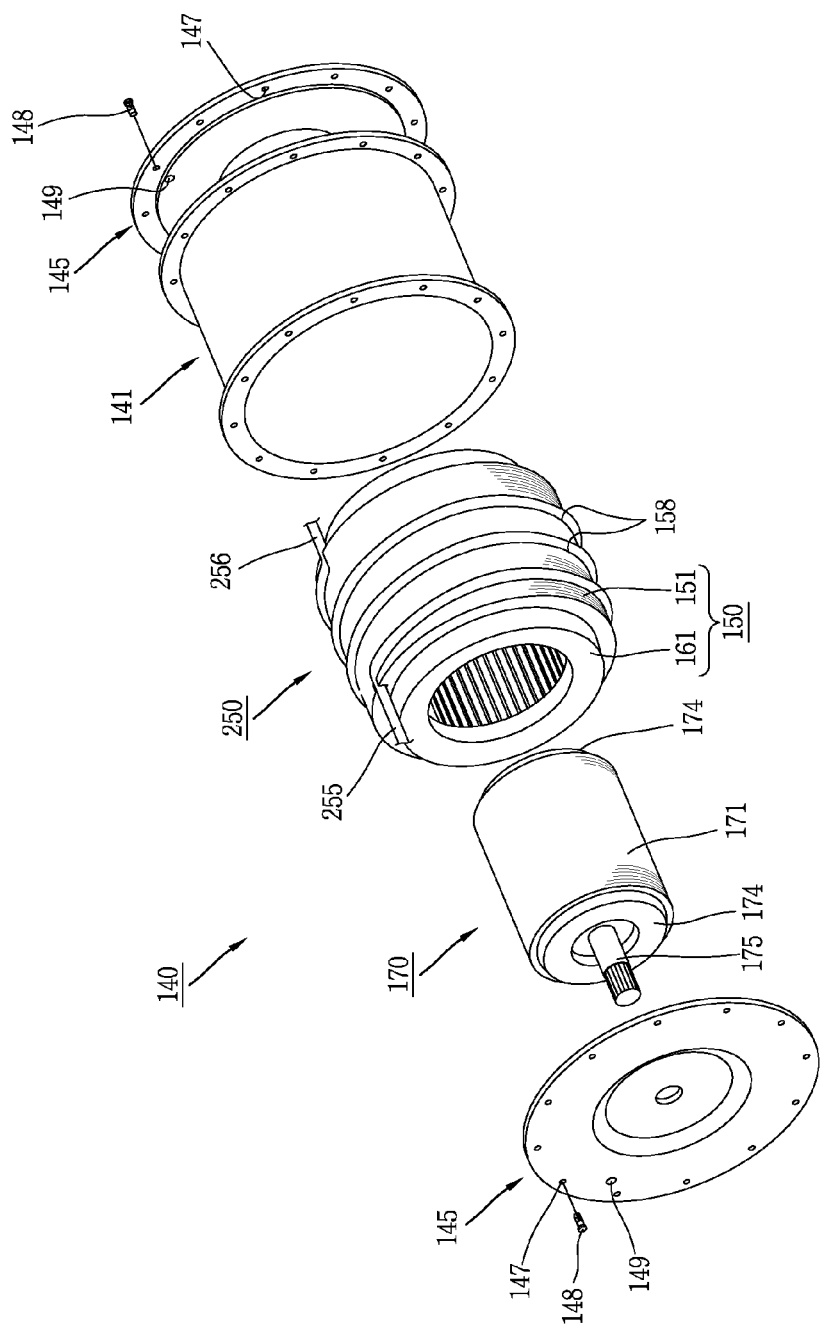
FIG. 13 is an exploded perspective view of an electric motor according to another embodiment of the present invention.
Figure 14:
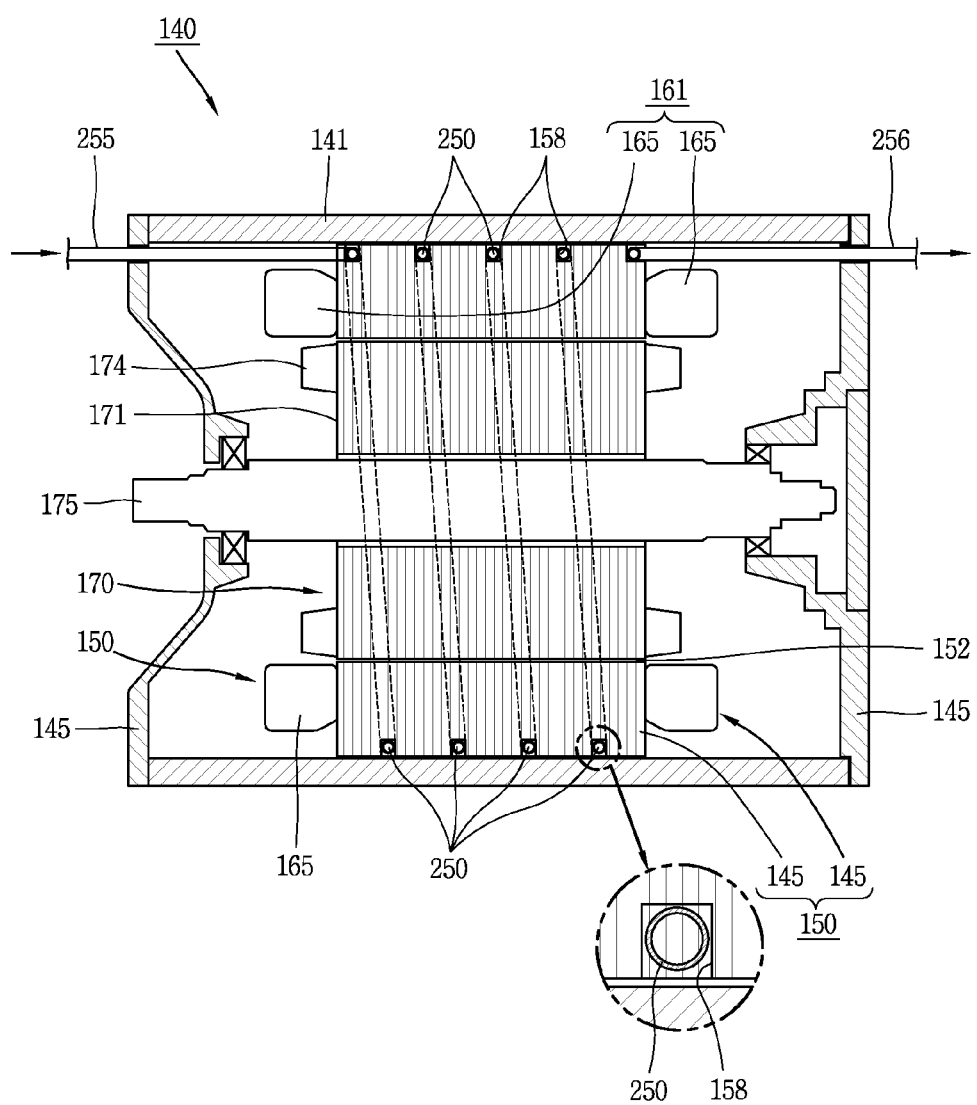
FIG. 14 is a sectional view of the electric motor of FIG. 13.

For example, as shown in FIGS. 13 and 14, the cooling unit 250 may be formed to wound several times in a spiral form around the circumference of the stator 150.

A cooling unit coupling unit 158 may be formed on the circumference of the stator core 151 to allow the cooling unit 250 to be coupled. The cooling unit coupling unit 158 may be configured as, for example, a spiral groove 158 depressed in a radial direction on an outer circumferential surface of the stator core 151 and extending in a spiral form.

A cooling fluid inflow portion 255 may be formed at one end portion of the stator core 151 to allow a cooling fluid to be introduced into the cooling unit 250. A cooling fluid outflow portion 256 may be formed at the other end portion of the stator core 151 to allow the fluid of the cooling unit 250 to flow out therethrough.

Figure 15:
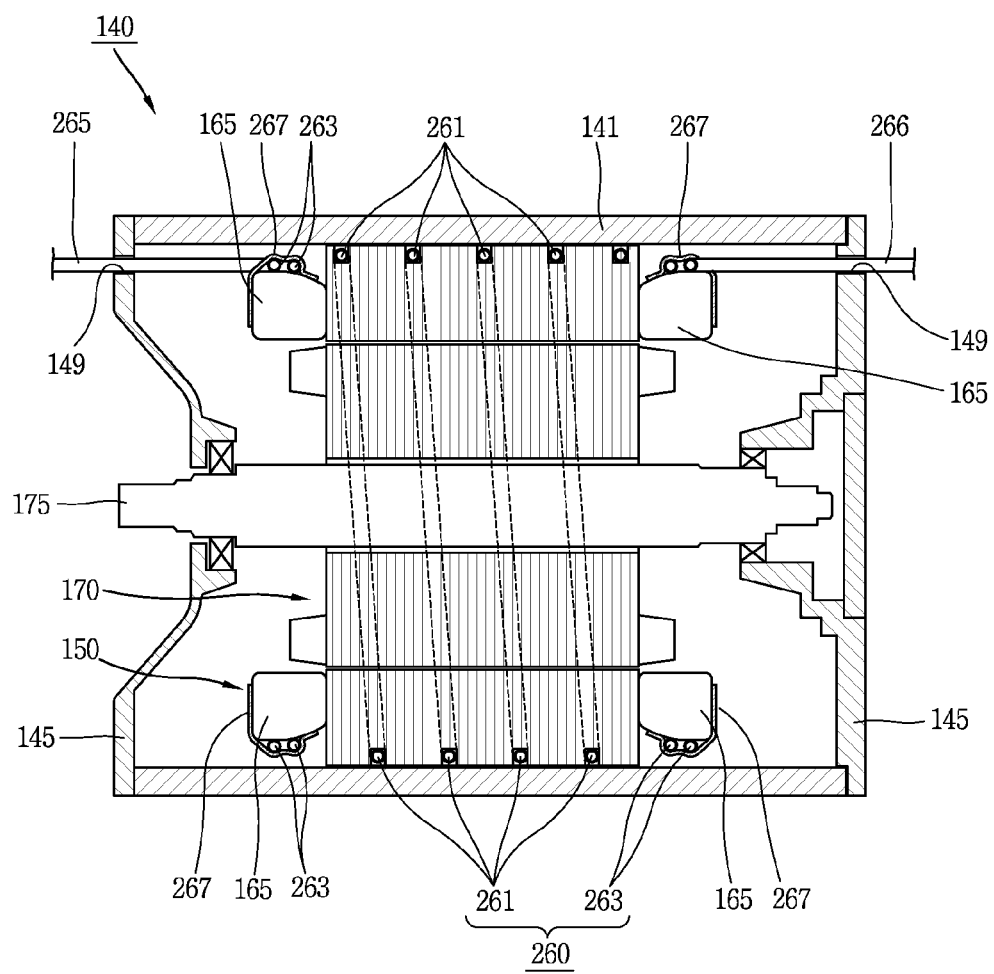
FIG. 15 is a sectional view of an electric motor according to another embodiment of the present invention.

Meanwhile, as show in FIG. 15, a cooling unit 260 may include a stator core cooling unit 261 in contact with the stator core 151; and a coil end cooling unit 263 in contact with the coil end 165 of the stator coil 161.

The stator core cooling unit 261 may be coupled in a spiral form on the circumference of the stator core 151.

The spiral groove 158 may be formed on the outer circumferential surface of the stator core 151 to allow the stator core cooling unit 261 to be coupled thereto.

The spiral groove 158 may be depressed to have a pre-set depth in a radial direction from the outer circumferential surface of the stator core 151 and extend in a spiral form.

The coil end cooling unit 263 may be formed to be in contact with the circumference of the coil end 165 of the stator coil 161. The coil end cooling unit 263 may be wound around the circumference of the coil end 165 at least one or more times.

Meanwhile, a heat transmission member 267 may be provided to connect the coil end cooling unit 263 and the coil end 165 in order to accelerate heat transmission between the coil end cooling unit 263 and the coil end 165.

The heat transmission member 267 may be configured as a metal tape (e.g., an aluminum (Al) tape) that can be attached.

One side of the heat transmission member 267 may be attached to the coil end 165, and the other side of the heat transmission member 267 may be attached to the coil end cooling unit 263. Accordingly, heat of the coil end 165 may be quickly transferred to the coil end cooling unit 263 through the heat transmission member 267.

The coil end cooling unit 263 and the stator core cooling unit 261 may be connected in series. Accordingly, the cooling fluid, while sequentially passing through the coil end cooling unit 263 and the stator core cooling unit 261, may be able to cool the coil end 165 and the stator core 151.

The coil end cooling units 263 may be disposed at both end portions of the stator core 151.

A cooling fluid inflow portion 265 through which the cooling fluid is introduced may be formed on any one of the coil end cooling units 263, and a cooling fluid outflow portion 266 through which the cooling fluid flows out may be formed on the other of the coil end cooling units 263. In the present embodiment, the cooling fluid inflow portion 265 is formed at the coil end cooling unit 263 on the left side of the drawing, and the cooling fluid outflow portion 266 is formed at the coil end cooling unit 263 on the right side of the drawing.

According to such a configuration, when the electric motor 140 is driven, the controller 230 controls the pump 225 to allow the cooling fluid to circulate by way of the electric motor 140.

The cooling fluid introduced through the cooling fluid inflow portion 265 may cool the coil end 165 at one side (left side in the drawing) and cool the stator core 151 while passing through the stator core cooling unit 261.

The cooling fluid which has passed through the stator core cooling unit 261 may be introduced into the coil end cooling unit 263 to cool the coil end 165 and then flow out through the cooling fluid outflow portion 266.

Meanwhile, the discharged cooling fluid passes through the radiator 227 so as to be cooled, and passes through the tank 226 so as to be pumped by the pump 225. Repeating this process, cooling operation may be continuously performed on the electric motor 140.

Another embodiment of the present invention will be described with reference to FIGS. 16 to 20.

As described above, an electric vehicle according to another embodiment of the present invention may be configured to include the vehicle body 110, the battery 125 provided in the vehicle body 110, and the electric motor 140 connected with the battery 125 to provide driving force to the vehicle body 110.

A passenger space (not shown) allowing a driver and a passenger to get on may be provided at an upper area of the vehicle body 110.

An air-conditioner (not shown) may be provided in the vehicle body 110 in order to provide thermally treated air (cooled or heated air) to the passenger space.

The electric motor 140 may be provided in the vehicle body 110 to provide driving force to the wheels 115.

The battery 125 may be provided in the vehicle body 110 to provide power to the electric motor 140.

The inverter device 130 may be provided between the electric motor 140 and the battery 125. The inverter unit 130 may convert DC power provided from the battery 125 into AC power and provide the converted AC power to the electric motor 140.

A deceleration device or a decelerator (or speed reducer) 280 may be provided at one side of the electric motor 140.

Figure 16:
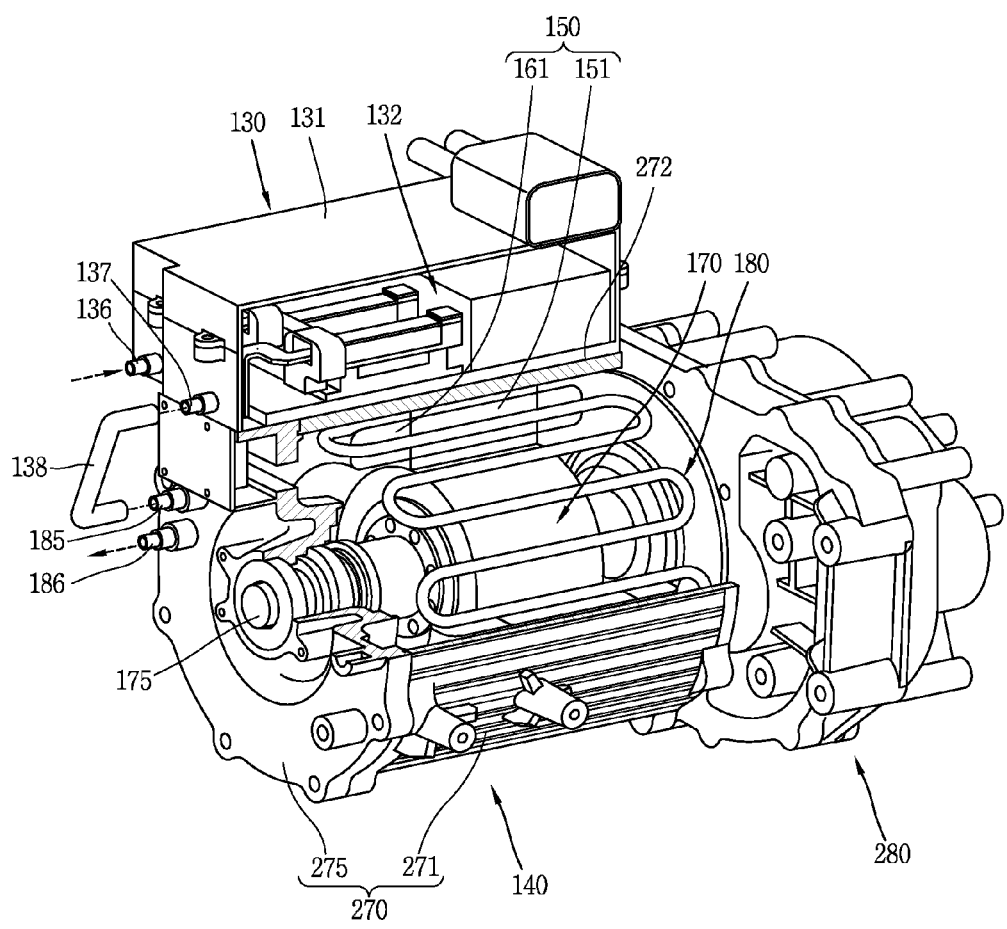
FIG. 16 is a partially cutout perspective view of an electric motor of an electric vehicle according to another embodiment of the present invention.
Figure 17:
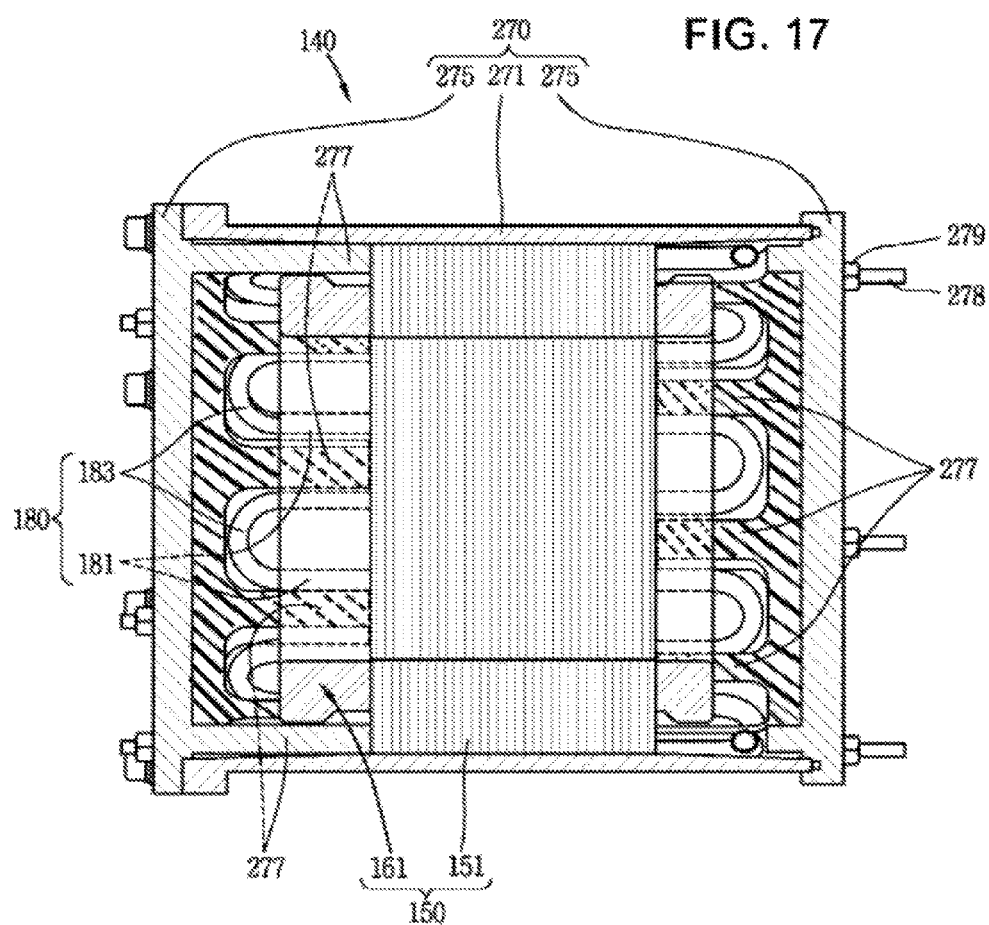
FIG. 17 is a sectional view of a frame and a stator of the electric motor of FIG. 16.

Meanwhile, as shown in FIGS. 16 and 17, for example, the electric motor 140 may include a frame 270 forming an accommodation space therein, the stator 150 having the stator core 151 and the stator coil 161 and disposed within the frame 270, a rotor 170 disposed to be rotatable with respect to the stator 150, and the cooling unit 180 formed to allow a cooling fluid to flow therein and disposed to be in contact with the stator 150 to cool the stator 150. Linear grooves 157 in which the cooling unit 180 is inserted, may be configured on an outer surface of the stator core 151. The stator grooves 157 may be formed on an outer surface of the stator core 151 in a radial direction and extend in an axial direction.

The rotor 170 may be configured to include, for example, a field winding generating magnetic force when power is applied. Also, the rotor may be configured as a synchronization rotor using a difference in magnetic resistance (reluctance). Also, the rotor may be configured as a hybrid rotor having a magnetic resistance difference and a permanent magnet. Also, the rotor may be configured to include a field winding which generates magnetic force when power is applied. Also, the rotor may be configured as a so-called permanent magnet rotor having a permanent magnet, a synchronization rotor using a difference in magnetic resistance (reluctance), and a hybrid rotor having both a magnetic resistance difference and a permanent magnet.

The cooling unit 180 may be configured to include, for example, a plurality of linear section portions 181 disposed in an axial direction on an outer surface of the stator core 151 and a plurality of curved section portions 183 connecting the linear section portions 181 in a communicating manner.

The frame 270 may be configured to include, for example, a cylindrical unit 271 having a cylindrical shape with both sides thereof opened, and covers 275 provided at both end portions of the cylindrical unit 271. The cylindrical unit 271 and the covers 275 may be detachably coupled by, for example, a plurality of fastening members 278 and nuts 279.

The stator 150 may be accommodated in the cylindrical unit 271.

The stator 150 may be configured to have, for example, a length reduced in the axial direction in comparison to the cylindrical unit 271.

The frame 270 may include, for example, support portions 277 supporting the stator 150 such that the stator 150 is curbed (or supported) in the axial direction.

The support portions 277 may be configured to be, for example, protruded in the axial direction from an inner surface of each cover 275.

The support portions 277 may be configured to be spaced apart from one another in a circumferential direction.

In detail, respective support portions 277 may be protruded between the cylindrical unit 271 and the coil end 165 of the stator coil 161.

Also, the respective support portions 277 may be disposed between the curved section portions 183 of the cooling unit 180.

End portions of the respective support portions 277 may be in contact with an end portion surface of the stator core 151. Accordingly, the stator core 151 can be restrained from moving in the axial direction within the frame 270.

Meanwhile, an inverter device mounting unit 272 allowing the inverter device 130 to be mounted thereon may be provided on an outer surface of the frame 270. The inverter device mounting unit 272 may be mounted, for example, on a upper end of the frame 270 of the electric motor 140. The position of the inverter device mounting unit 272 may be adjusted.

The inverter device 130 may include a case 131 forming an accommodation space therein and a circuit component 32 provided within the case 131. The circuit component 132 may be configured to include a switching element (e.g., an insulated gate bipolar transistor (IGBT)).

Meanwhile, the electrical vehicle according to the present embodiment may be configured to include the cooling fluid circulation unit 220 allowing a cooling fluid to circulate by way of the cooling unit 180 of the electric motor 140.

Figure 18:
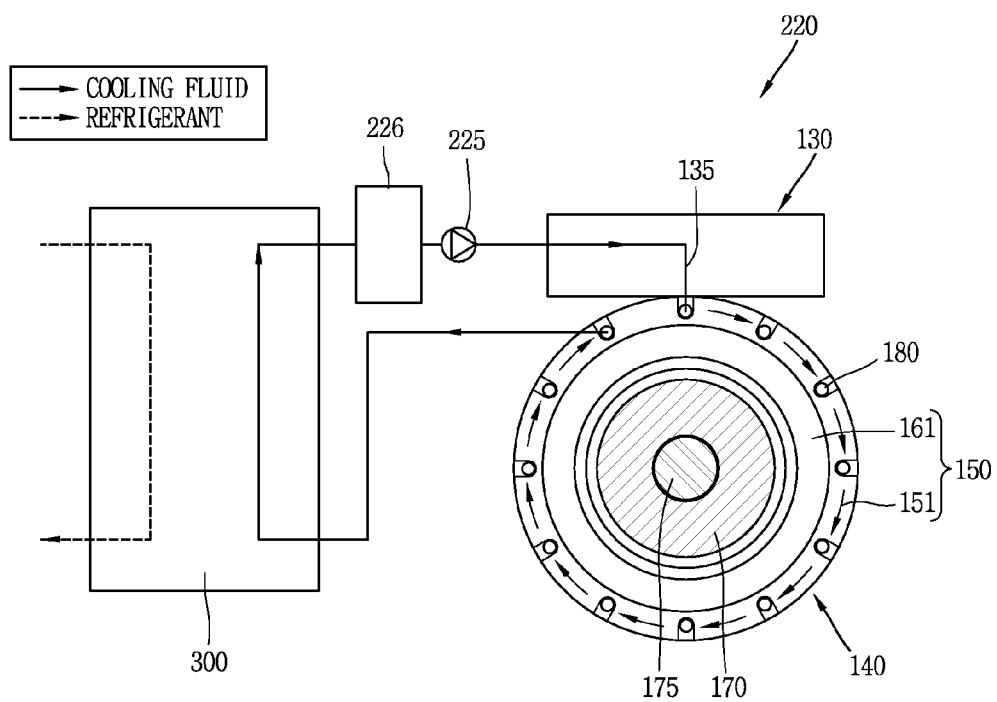
FIG. 18 is a view showing a configuration of a cooling fluid circulation unit of the electric vehicle of FIG. 16.

As shown in FIG. 18, the cooling fluid circulation unit 220 may form a closed loop in which the cooling fluid that passes through the cooling unit 180 is introduced into a heat exchanger 300 of the air-conditioner so as to be cooled, and the cooling fluid, which has been cooled by way of the heat-exchanger 300 of the air-conditioner, is heat-exchanged while passing through the inverter device 130, and then, introduced to and circulates in the cooling unit 180.

The inverter device 130 may be configured to include, for example, an inverter device cooling unit 135 to which a cooling fluid is introduced or from which a cooling fluid flows out to cool the interior.

The case 131 of the inverter device 130 may include a cooling fluid inflow portion 136 through which a cooling fluid is introduced into the inverter device cooling unit 135, and a cooling fluid outflow portion 137 from which the cooling fluid flows out. The other end portion of a connection pipe 138, whose one end portion is connected to the cooling unit 180 of the electric motor 140, may be connected to the cooling fluid outflow portion 137. Accordingly, the cooling fluid, which has passed through the inverter device cooling unit 135, may be introduced into the cooling unit 180 of the electric motor 140.

The air-conditioner may be implemented as a so-called vapor compression refrigerating cycle device in which a refrigerant is compressed, expanded, condensed, and evaporated, while circulating.

The air-conditioner may be configured to include, for example, the heat-exchanger 300 in which the cooling fluid, which has passed through the cooling unit 180 of the electric motor 140, is circulated to be heat-exchanged with a refrigerant and cooled.

The air-conditioner may also be configured such that heat (energy) recovered (absorbed) while cooling the cooling fluid is used for heating a passenger space of the vehicle body 110.

Figure 19:
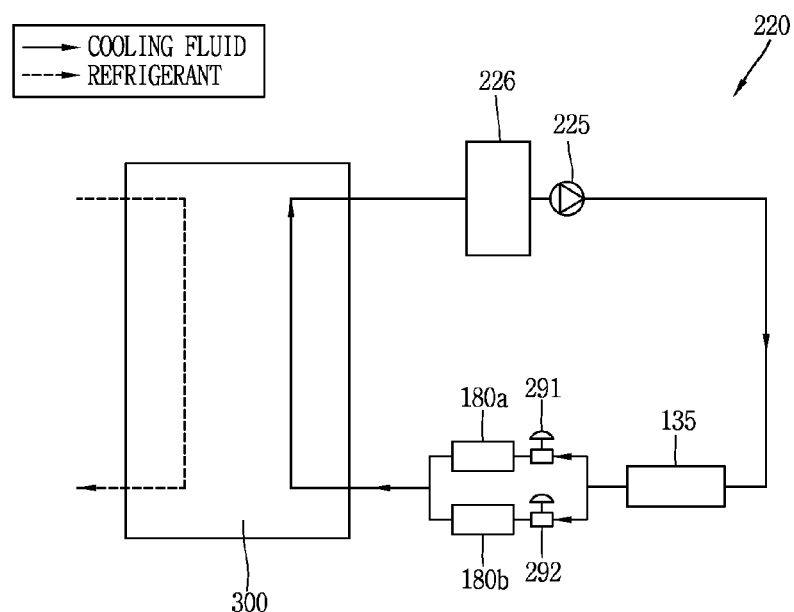
FIG. 19 is a view showing a variant of the cooling fluid circulation unit of the electric vehicle of FIG. 16.

Meanwhile, as shown in FIG. 19, the cooling unit 180 of the electric motor 140 may be configured to include a plurality of partial cooling units 180a and 180b connected in parallel.

The cooling unit 180 of the electric motor 140 may be configured to include a plurality of opening and closing valves 291 and 292 for opening and closing the respective partial cooling units 180a and 180b. The opening and closing valves 291 and 292 may include, for example, a first opening and closing valve 291 for opening and closing the first partial cooling unit 180a and a second opening and closing valve 292 for opening and closing the second partial cooling unit 180b.

The cooling unit 180 of the electric motor 140 may be configured to include, for example, an entirety cooling mode in which a cooling fluid is introduced to both of the partial cooling units 180a and 180b and a partial cooling mode in which a cooling fluid is introduced into a portion of the partial cooling units 180a and 180b.

In the present embodiment, the electric vehicle may be configured to include a controller 230 for controlling a flow of the cooling fluid of the cooling fluid circulation unit 220.

As for the electric vehicle according to the present embodiment, for example, when the cooling unit 180 of the electric motor 140 includes a plurality of partial cooling units 180a and 180b, the electric vehicle may further include a mode selection unit 237 for selecting any one of the partial cooling mode and the entirety cooling mode.

Figure 20:
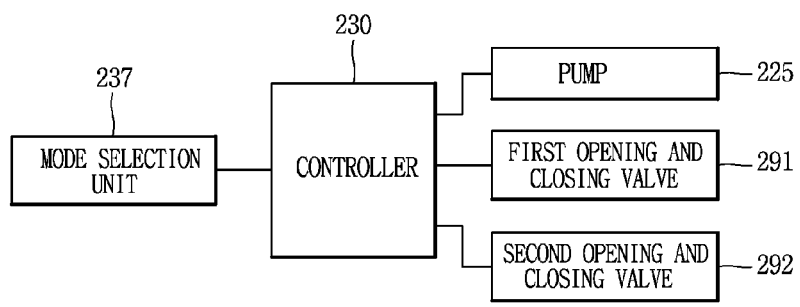
FIG. 20 is a control block diagram of the electric vehicle of FIG. 16.

As shown in FIG. 20, the mode selection unit 237 and the first opening and closing valve 291 and the second opening and closing valve 292 may be connected to the controller 230 such that the mode selection unit 237 and the first opening and closing valve 291 and the second opening and closing valve 292 can be controlled by the controller 230.

For example, when a mode is selected by the mode selection unit 237, the controller controls the first opening and closing valve 291 and the second opening and closing valve 292 to allow the cooling fluid to pass through both of the partial cooling units 180a and 180b or to pass through only a portion of the partial cooling units 180a and 180b.

According to this configuration, when power is applied to the electric motor 140 and the entirety cooling mode is selected by the mode selection unit 237, the controller 230 may control the first opening and closing valve 291 and the second opening and closing valve 292 to be opened. The controller 230 may control the pump 225 to circulate the cooling fluid.

When the pump 225 is driven, the cooling fluid passes through the inverter device cooling unit 135 to cool the inverter device 130, and the cooling fluid heat-exchanged in the inverter device 130 may be introduced to the partial cooling units 180a and 180b of the electric motor 140, respectively.

The cooling fluid heat-exchanged while passing through the partial cooling units 180a and 180b of the electric motor 140 joins and moves to the heat exchanger 300 of the air-conditioner. The cooling fluid which has moved to and cooled in heat exchanger 300 of the air-conditioner moves again to the inverter device cooling unit 135, and this process may be repeatedly performed.

Meanwhile, when the partial cooling mode is selected by the mode selection unit 237, the controller 230 may control any one of the first opening and closing valve 291 and the second opening and closing valve 292 to open a flow path and the other to close a corresponding flow path. Accordingly, the cooling fluid pumped by the pump 225 is heat-exchanged by way of the inverter device cooling unit 135, and may be heat-exchanged while passing through the opened partial cooling units 180a and 180b.

The cooling unit which has passed through the cooling unit 180 of the electric motor 140 is cooled while passing through the heat exchanger 300 of the air-conditioner and moves to the inverter device cooling unit 135, and this process may be repeatedly performed.

Particular embodiments of the present invention have been illustrated and described. However, as the embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims.

Also, although an embodiment has not been described in the above disclosure, it should be extensively construed within the scope of the technical concept defined in the claims. And, various changes and modifications that fall within the scope of the claims, or equivalents of such scope are therefore intended to be embraced by the appended claims.

The invention claimed is:

1. An electric motor comprising:
    a stator including a stator core and a stator coil wound around the stator core;
    a rotor disposed to be rotatable with respect to the stator;
    a frame accommodating the stator and the rotor therein; and
    a cooling unit to allow a cooling fluid to flow therein and disposed to be in contact with the stator to cool the stator,
    wherein the frame comprises a cylindrical unit having a cylindrical shape with both sides thereof opened, and covers provided at both end portions of the cylindrical unit,
    wherein an outer surface of the stator core includes grooves in which the cooling unit is inserted,
    wherein the frame comprises a plurality of support portions for supporting the stator such that the stator is curbed in an axial direction,
    wherein the cooling unit comprises linear section portions disposed in an axial direction on the stator core and curved section portions connecting the linear section portions, and
    wherein each of the plurality of support portions is protruded from an inner surface of each of the covers and is disposed between the curved section portions such that an end portion of each of the plurality of support portions comes in contact with one of both end portions of the stator core.

2. The electric motor of claim 1, wherein the grooves are depressed in a radial direction on the outer surface of the stator core and extend in an axial direction, and the cooling unit is formed by bending a pipe having an extended length several times.

3. The electric motor of claim 1, wherein the grooves are depressed in a radial direction on the outer surface of the stator core and extend in an axial direction, and the cooling unit includes a plurality of partial cooling units formed by bending a pipe having an extended length several times.

4. The electric motor of claim 3, wherein the partial cooling units are connected in series by a connection pipe.

5. The electric motor of claim 3, wherein the partial cooling units are connected to be parallel.

6. The electric motor of claim 3, wherein each of the partial cooling units includes mutually different cooling fluid inlet and cooling fluid outlet allowing a cooling fluid to be introduced or discharged therethrough.

7. The electric motor of claim 6, wherein the cooling unit includes an entirety cooling mode in which the cooling fluid is supplied to all of the partial cooling units and a partial cooling mode in which the cooling fluid is supplied to a portion of the partial cooling units.

8. The electric motor of claim 1, wherein the grooves are depressed in the radial direction on the outer surface of the stator core and extend in a spiral form.

9. The electric motor of claim 1, wherein the cooling unit includes a stator core cooling unit for cooling the stator core and a coil end cooling unit for cooling a coil end of the stator coil.

10. An electric vehicle comprising:
    a vehicle body;
    a battery provided in the vehicle body; and
    an electric motor connected to the battery to provide driving force to the vehicle body,
    wherein the electric motor comprises:
    a stator including a stator core and a stator coil wound around the stator core;
    a rotor disposed to be rotatable with respect to the stator;
    a frame accommodating the stator and the rotor therein; and
    a cooling unit to allow a cooling fluid to flow therein and disposed to be in contact with the stator to cool the stator,
    wherein the frame comprises a cylindrical unit having a cylindrical shape with both sides thereof opened, and covers provided at both end portions of the cylindrical unit,
    wherein an outer surface of the stator core includes grooves in which the cooling unit is inserted,
    wherein the frame comprises a plurality of support portions for supporting the stator such that the stator is curbed in an axial direction,
    wherein the cooling unit comprises linear section portions disposed in an axial direction on the stator core and curved section portions connecting the linear section portions, and
    wherein each of the plurality of support portions is protruded from an inner surface of each of the covers and is disposed between the curved section portions such that an end portion of each of the plurality of support portions comes in contact with one of both end portions of the stator core.

11. The electric vehicle of claim 10, further comprising:
    an inverter device connected to the stator coil and controlling power,
    wherein the frame includes an inverter device mounting unit on which the inverter device is mounted.

12. The electric vehicle of claim 10, further comprising:
    a heat exchanger of an air-conditioner disposed at the vehicle body for providing thermally treated air to the vehicle body; and
    a cooling fluid circulation unit in which a cooling fluid circulates by way of the cooling unit of the electric motor,
    wherein the cooling fluid circulation unit is configured to form a closed loop in which the cooling, which has passed through the cooling unit, is introduced into the heat exchanger of the air-conditioner so as to be cooled and the cooling fluid which has passed through the heat exchanger passes through the inverter device so as to be cooled, and then, is introduced into the cooling unit so as to circulate.

* * * * *